(12) United States Patent
Palese

(10) Patent No.: US 6,624,922 B1
(45) Date of Patent: Sep. 23, 2003

(54) ELECTRO-OPTIC DEVICE FOR ADDING/SUBTRACTING OPTICAL SIGNALS

(75) Inventor: Stephen P. Palese, Torrance, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 29 days.

(21) Appl. No.: 09/586,014

(22) Filed: Jun. 2, 2000

(51) Int. Cl.[7] .............................. G02F 1/35; G02F 1/03
(52) U.S. Cl. .................... 359/326; 359/241; 359/244; 359/245
(58) Field of Search ................... 359/326–332, 359/241, 244, 245, 276, 278, 279, 107; 372/21, 22, 26, 28

(56) References Cited

U.S. PATENT DOCUMENTS

| | | | | |
|---|---|---|---|---|
| 4,236,243 A | * | 11/1980 | Davies et al. ............ | 359/132 |
| 4,773,739 A | * | 9/1988 | Valley et al. ............ | 359/300 |
| 5,229,878 A | * | 7/1993 | Tomita et al. ............ | 359/248 |
| 5,289,489 A | * | 2/1994 | Bergquist et al. ........ | 372/26 |
| 5,751,455 A | * | 5/1998 | Shibutani et al. ........ | 359/126 |
| 5,832,148 A | * | 11/1998 | Yariv ....................... | 385/16 |
| 5,909,303 A | * | 6/1999 | Trezza et al. ............ | 359/248 |
| 5,959,764 A | * | 9/1999 | Edagawa et al. ........ | 359/326 |

* cited by examiner

*Primary Examiner*—John D. Lee
(74) *Attorney, Agent, or Firm*—Robert W. Keller

(57) ABSTRACT

An electro-optic interconnect for use with optical signals and a probe beam is disclosed. A plurality of first optoelectronic detectors responds to an optical signal and develops a plurality of first electrical signals. A probe laser generates the probe beam. Means are responsive to the plurality of first electrical signals and changes a characteristic of the optical probe beam. A second optoelectronic detector responds to the changed characteristic and develops an output electrical signal representative of the optical signals. Alternatively, the second optoelectronic detector can be eliminated and direct optical signal processing can be implemented. In another aspect, a time compensation network serves to synchronize the probe and the signal beams. The electro-optic interconnect can be configured to add and subtract the optical signals.

17 Claims, 8 Drawing Sheets

US 6,624,922 B1

ELECTRO-OPTIC DEVICE FOR ADDING/SUBTRACTING OPTICAL SIGNALS

CROSS-REFERENCES TO RELATED APPLICATIONS

The present application is related to co-pending U.S. patent application Ser. No. 09/587,125, filed Jun. 2, 2000, entitled: "Optical Interconnect Capable Of Performing Addition/Subtraction" by Stephen Palese, now U.S. Pat. No. 6,516,503, assigned to the same assignee as this present invention, and its contents are incorporated herein by reference.

Also related to U.S. patent application Ser. No. 09/587, 126, filed Jun. 2, 2000, entitled: "Time Compensation Architectures For Controlling Timing Of Optical Signals" by Stephen Palese, now U.S. Pat. No. 6,580,540, assigned to the same assignee as this present invention, and its contents are incorporated herein by reference.

Also related to U.S. patent application Ser. No. 09/587, 124, filed Jun. 2, 2000, entitled; "Optoelectronic Communication System In Turbulent Medium Having Array of Photodetectors and Time Compensation" by Stephen Palese, now U.S. Pat. No. 6,585,432, assigned to the same assignee as this present invention, and its contents are incorporated herein by reference.

Also related to U.S. patent application Ser. No. 09/586, 513, filed Jun. 2, 2000, entitled: "Optical Communication System Using Optical Transcription Material" by Stephen Palese, assigned to the same assignee as this present invention, and its contents are incorporated herein by reference.

BACKGROUND OF THE INVENTION

1. Field of the Invention

The present invention generally relates to an optoelectronic device, and more particularly to an electro-optic interconnect that can be configured for adding and subtracting optical signals.

2. Description of the Prior Art

The telecommunications industry is switching rapidly from an electronic system to a hybrid platform which utilizes both electronics and photonics to increase the operating bandwidth of the communication system. Today's communication systems consist of optical fiber networks, fiber amplifiers, optical diode transmitters, and high speed semiconductor receivers. However, there are problems in that the industry does not have a satisfactory optoelectronic interconnect, especially one that can be useful for directly adding or subtracting optical signals when processing received optical signals.

What is needed, therefore, is an electro-optic interconnect device that is capable of adding and/or subtracting optical signals and converting the result into a sum signal.

SUMMARY OF THE INVENTION

The preceding and other shortcomings of the prior art are addressed and overcome by the present invention that provides generally an electro-optic interconnect. It can be configured with a probe beam for selectively adding or subtracting optical signals. The electro-optic device comprises a plurality of optoelectronic detectors, each being responsive to an optical signal and operative to develop an electrical signal. A probe laser generates an optical probe beam. An electro-optic crystal senses electrical signals and changes the polarization rotation or phase of the optical probe. A second detector is responsive to the changed characteristic of the probe beam and develops an output or resultant signal representative of the sum of the optical signals. The modulator can be adjusted to cause its associated probe beam at different interconnect sites to be subtracted, rather than summed.

Alternatively, the second detector can be eliminated and direct optical processing of the probe beam can be implemented.

In other aspects, the bias voltage on the photodetectors is reversed in polarity or the electro-optic crystal orientation can be changed to cause subtraction of its associated optical signal. The output signal may be electrical or optical.

The foregoing and additional features and advantages of this invention will become apparent from the detailed description and accompanying drawing figures below. In the figures and the written description, numerals indicate the various elements of the invention, like numerals referring to like elements throughout both the drawing figures and the written description.

DETAILED DESCRIPTION OF THE PREFERRED EMBODIMENTS

Figure 1:
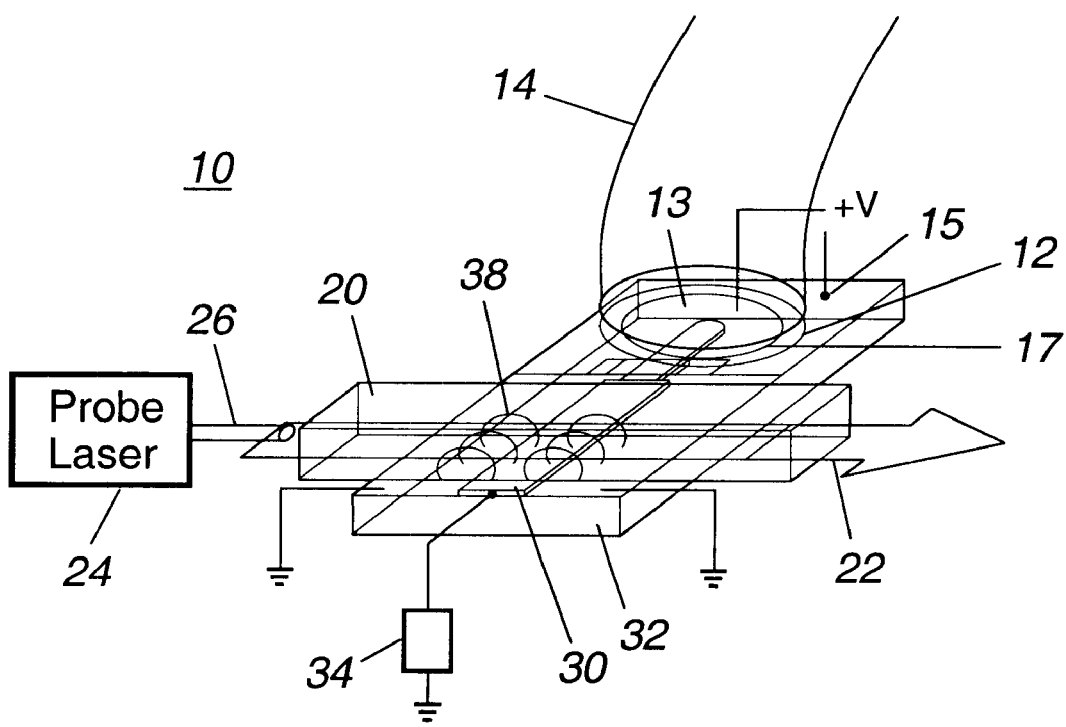
FIG. 1 is a diagram of an electro-optic interconnect used in accordance with the present invention.

As illustrated in the block diagram of FIG. 1, the present invention provides an electro-optic interconnect or device, generally designated by the numeral 10.

Referring now to FIG. 1 the electro-optic interconnect 10 comprises a small area high speed photodetector 12 that converts an optical signal into an electrical signal having a magnitude depending upon the amount of light incident on it, and has an intrinsic response time of 5 ps. A bias voltage +V is applied across its electrodes 13 and 15 that are separated by a guardrail 17.

Figure 2:
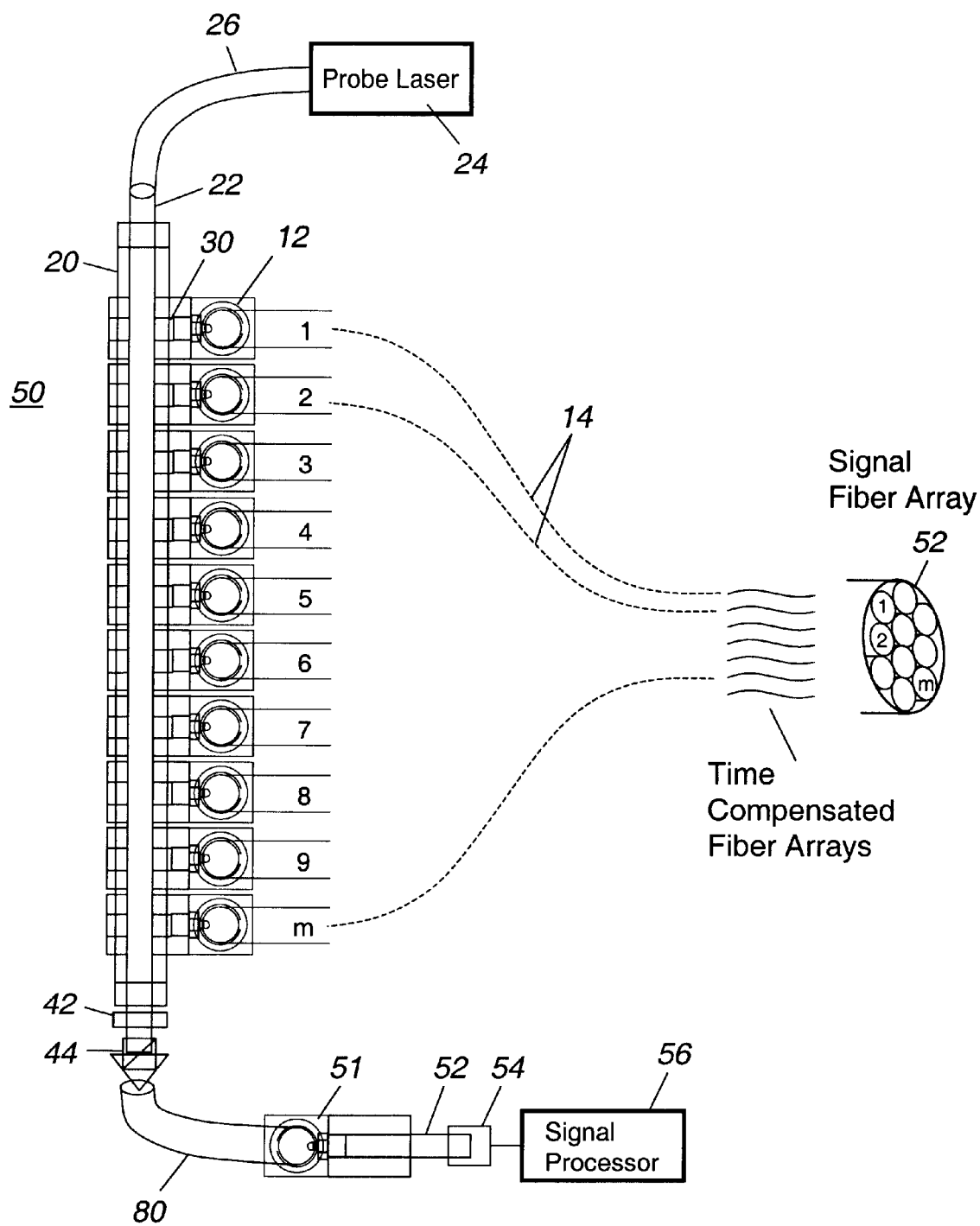
FIG. 2 is a diagram illustrating another alternative electro-optic interconnect used in accordance with the present invention.

Alternatively, the detector may be a photocathode microchannel, a superconducting detector or any other photoactivated compound device. The device 10 includes two optoelectronic detectors 12. FIG. 2 shows one of the optoelectronic detectors 12 in detail. An optical fiber 14 is attached to the detector and propagates an optical beam or signal 16 onto the detector 12.

An electro-optic crystal 20 or waveguide extends longitudinally in an orientation orthogonal to the detector 12. The crystal 20 is formed from an electro-optic material (for example $LiTaO_3$, $LiNiO_3$, GaAs, or birefringent polymers), and as will be described with the birefringent axis properly oriented with respect to the electric field and an optical probe beam, shown diagrammatically by the arrow 22. A probe laser 24 generates the probe beam, or reading beam, longitudinally through a single mode optical fiber 26 and the crystal 20. The probe beam is preferably a continuous wave beam to provide real time signal processing. A microwave stripline 30 formed on a nonconducting substrate 32 extends perpendicularly to and supports the crystal 20 and propagates the electrical signal developed by the photodetector 12 to interact with the optical probe beam 22. The stripline 30 is terminated in a 50 ohm load 34 to prevent reflections from propagating back down the stripline which would degrade the temporal resolution. The substrate 32 is connected to the ground to prevent noise or extraneous signals from interfering with the electric signal on stripline 30.

More particularly, the electrical signal carried by the stripline 30 generates an electric field shown diagrammatically by the curved arrows 38 that penetrates into the underside of the electro-optic crystal 20 inducing a time dependent polarization rotation or phase change on the probe beam 22. This change varies with the electric field strength and therefore with the intensity of the light incident on the photodetector. The rotation depends on the crystal axis orientation relative to the electric field 38 created by the stripline signal.

With respect to FIG. 2, an array of optoelectronic detectors is shown. The optoelectronic detectors in the array are identical to the photodetector shown in FIG. 1. As illustrated by the numerals 1–m there are m detectors in the array, each having an end attached to one fiber 14 of the array of optical fibers 52. Each fiber 14 propagates an optical beam onto one detector 12.

Each signal from the two photodetectors 12 contributes to the total polarization rotation of the probe beam 22. These additive or subtractive changes are converted to an amplitude modulated signal on the fiber 22 with a $\lambda/2$ waveplate 42 and a polarizer 44. The $\lambda/2$ waveplate 42 can be adjusted to either homodyne or heterodyne the response. In heterodyne operation, the waveplate 42 is adjusted to allow some of the unmodulated probe beam 22 to pass through the waveplate. This sets up a local field that mixes with the signal and is used for linear operation.

The polarizer 44 converts the polarization rotation induced on the probe beam 22 to a time dependent amplitude modulation. For homodyne operation the waveplate 42 is adjusted and the polarizer 44 is crossed so no light leaks through when there is no voltage developed on a photodetector 12. For both heterodyne and homodyne operation, the polarizer 44 analyzes changes in the phase and polarization of the probe beam 22 produced by the electro-optic effect. A probe high speed photodetector 51 converts the amplitude modulated probe beam into a resultant electrical signal on conductor 52 to an output 54 for application to a signal processor 56. This represents the sum of the in-phase optical signals 16 projected through the fibers 14. Each of the signal photodetectors 12 contribute to the total polarization rotation of the probe beam 22.

In operation, optical signals on the optical fiber 14 propagate the optical signal to its optoelectronic detector 12. The detector 12 converts the optical signal into an electrical signal. The electrical signal is propagated down the stripline 30 to the 50 ohm load 34. The propagating electrical signal creates an electric field 38 outside the stripline 30. The electric field penetrates into the surface of the electro-optic crystal 20 and induces a time dependent polarization rotation or phase change on the probe beam 22. Each detector 12 induces a rotation or phase change corresponding to the received optical signal carried to it by its optical fiber, which are either additive or subtractive. The $\lambda/2$ waveplate 42 and polarizer 44 are adjusted to convert the total rotation or phase change to a resultant probe beam into a time dependent modulated optical signal. The probe high speed detector 50 converts this into an electrical signal representative of the optical signals. This is applied to the signal processor 56 which demodulates and further processes the electrical signal as desired.

Another technique for selecting whether to configure a photodetector in the summing mode or the subtractive mode is by changing the polarity of the bias voltage on the photodetector. With reference to FIG. 1 a bias voltage +V is applied to the electrodes 13 and 15 of the photodetector. A nonconducting guardrail 17 separates the electrodes. To sum the optical signals the two photodetectors are biased identically. To change photodetector to a subtraction mode, the polarity of the bias voltage is reversed. This may also require that the photodetector be changed from a pnp type to an npn type device.

Figure 3:
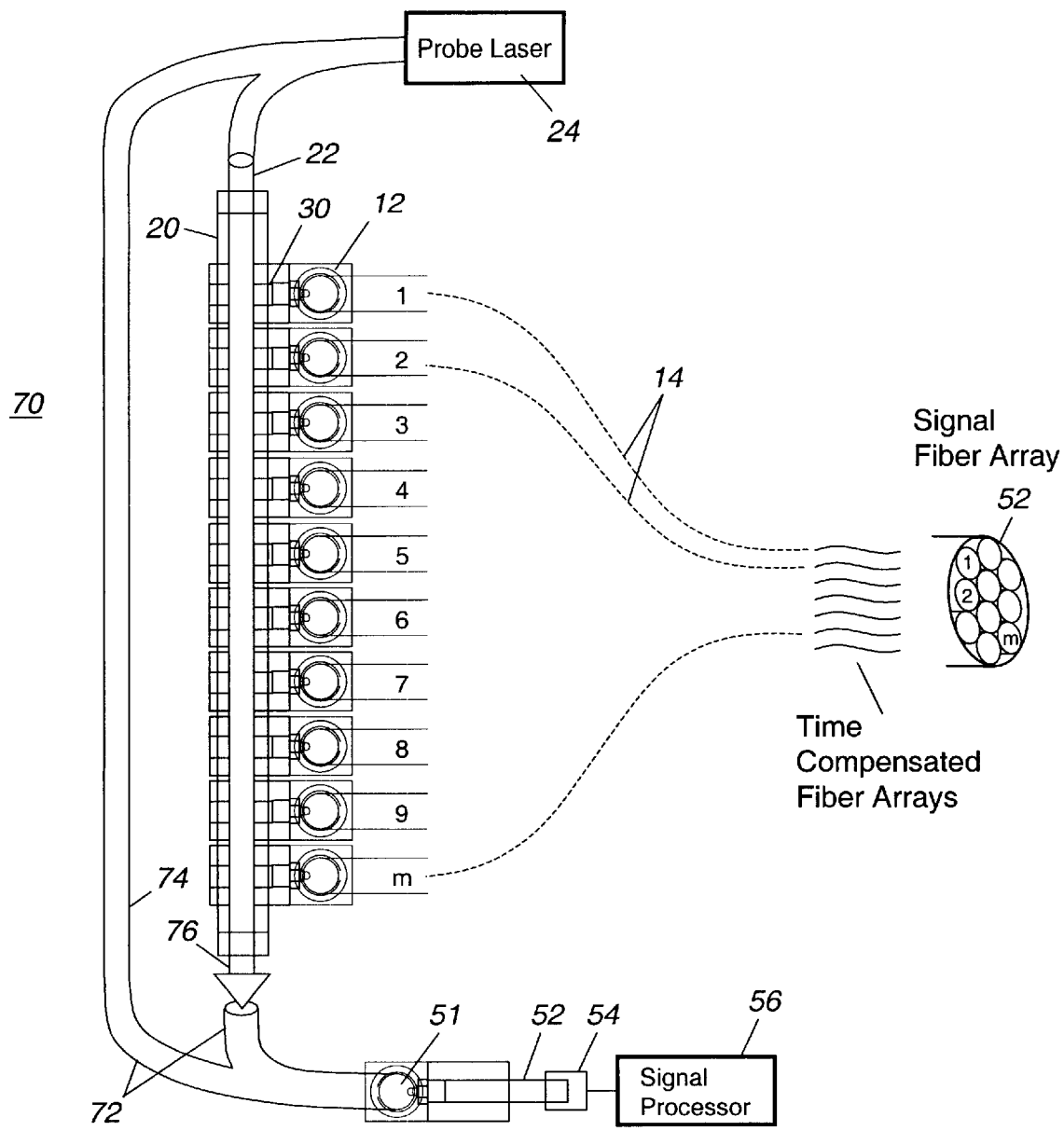
FIG. 3 is a diagram illustrating another alternative embodiment of the electro-optic interconnect in accordance with the present invention.

An alternative embodiment of the electro-optic interconnect is illustrated in FIG. 3. Many of the elements of the interconnect 70 are identical to like parts in the interconnect illustrated in FIG. 2 described above, and accordingly, there have been applied to each part of the interconnect in FIG. 3 a reference numeral corresponding to the reference numeral that was applied to the like part of the interconnect described above and shown in FIG. 2.

The fundamental difference between the interconnect shown in FIG. 3 and the interconnect shown in FIG. 2 is that it comprises a Mach-Zehnder interferometer 72 and thus employs phase modulation. Accordingly, it does not incorporate a $\lambda/2$ waveplate or polarizer. Each signal photodetector contributes to the total phase change of the probe beam 22. The fiber based Mach-Zehnder interferometer 72 comprises a reference leg 74 and an adjustable leg 76 which comprises the path of the probe beam through the electro-optic crystal 20. As was described, passage of the probe beam through the crystal varied depending on the electric signals produced by the optoelectronic detectors and their striplines.

The system and method of this invention can utilize many other types of optical interferometers. The optical interferometer splits light into two separate optical paths and then recombines this light interferometrically to create optical outputs that can present constructive and destructive interference. The wavelength of light and the relative optical path lengths of the two legs in the interferometer determine the particular state of interference that takes place when the light is combined. This state of interference determines if the output, or destructive interference, in which case there is an absence of optical intensity output. When one of the two optical path lengths within the interferometer is made to be adjustable, the state of interference can be continuously varied between the constructive and destructive interference states. The interferometer 72 serves to translate this phase change into a time dependent amplitude modulation which is detected by the probe high speed photodetector 51.

In operation the light on the optoelectronic detector 12 propagated by the optical fibers 14 in turn causes a phase delay in the probe beam. When there is no light on the detector 12 no phase delay occurs. This consequently unbalances the interferometer 72 and provides a signal to the photodetector 51.

Figure 4:
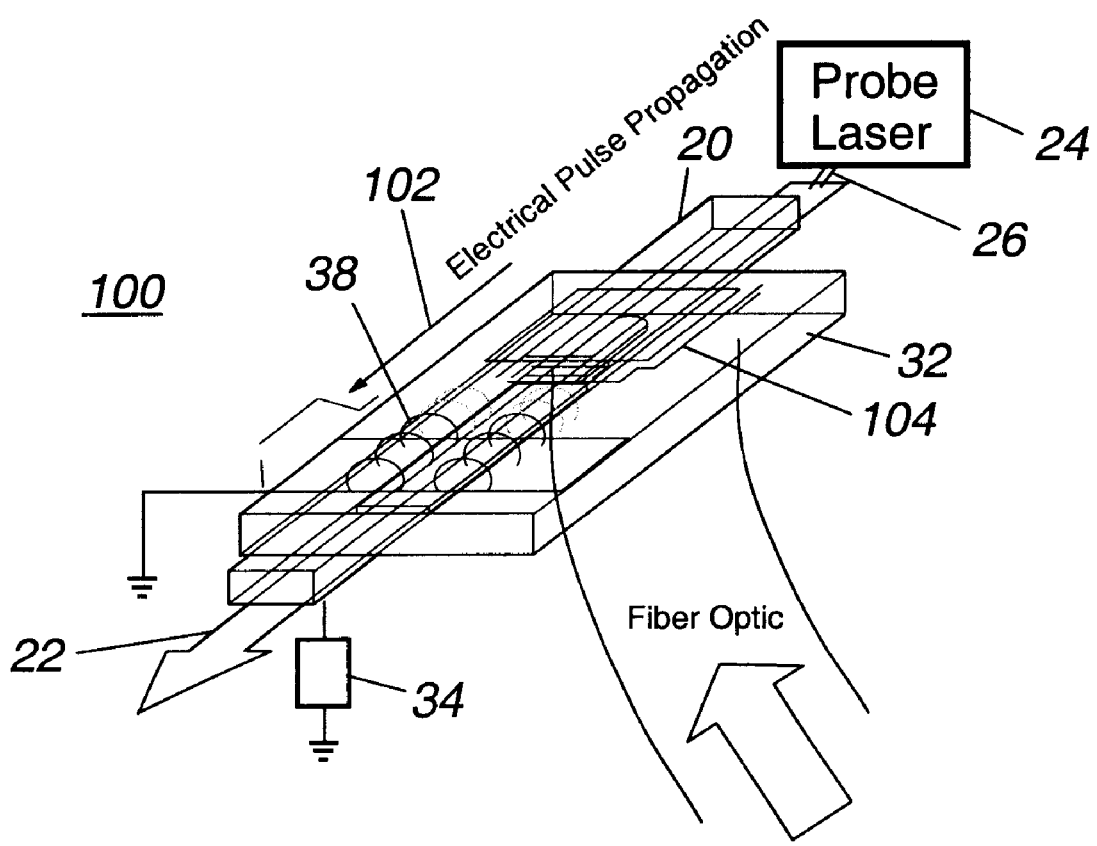
FIG. 4 is a diagram of an alternative embodiment of an electro-optic interconnect for use in a velocity matched configuration in accordance with the present invention.

An alternative embodiment of the fundamental optoelectronic interconnect 10 is illustrated in FIG. 4 and designated by the numeral 100. This is known as an electro-optic velocity matched configuration. Many of its elements are identical to like parts in the interconnect 10 in FIGS. 1 and 2 described above, and accordingly, there have been applied to each part of the interconnect in FIG. 4 a reference numeral corresponding to the reference numeral that was applied to the like part of the interconnect described above and shown in FIG. 1.

The fundamental difference between the device shown in FIG. 4 and the structure shown in FIG. 1 is that the electrical signal 102 and the probe beam 22 propagate in the same direction, comprises a velocity matched photodetector 104 that is preferably one that is available from the University of Rochester, and is back illuminated by the optical signal. Note that the signal is transmitted through the optical fiber 14 and the substrate 32 to the detector 104. This facilitates connection of the optical fiber to the detector. Generally it is desired to have the fiber as close as possible to the detector. It has been found that for ultraviolet wavelengths of the signal beam, back illumination works best, otherwise front illumination is used.

In this embodiment, the signal beam is transmitted through the optical fiber 14 and the substrate 32 material to the photodetector 104. This produces an electrical pulse which propagates down the microwave stripline 30 to the terminator 34. The propagating electric field 38 penetrates into the electro-optic crystal 20 inducing a time dependent polarization rotation or phase change on the probe beam. In the velocity matched configuration, the electrical signal 102 and the optical probe beam 22 propagate in the same direction leading to smaller transit time broadening (high frequency response) and/or longer effective crystal lengths (increased modulation depth of the probe beam).

Figure 5:
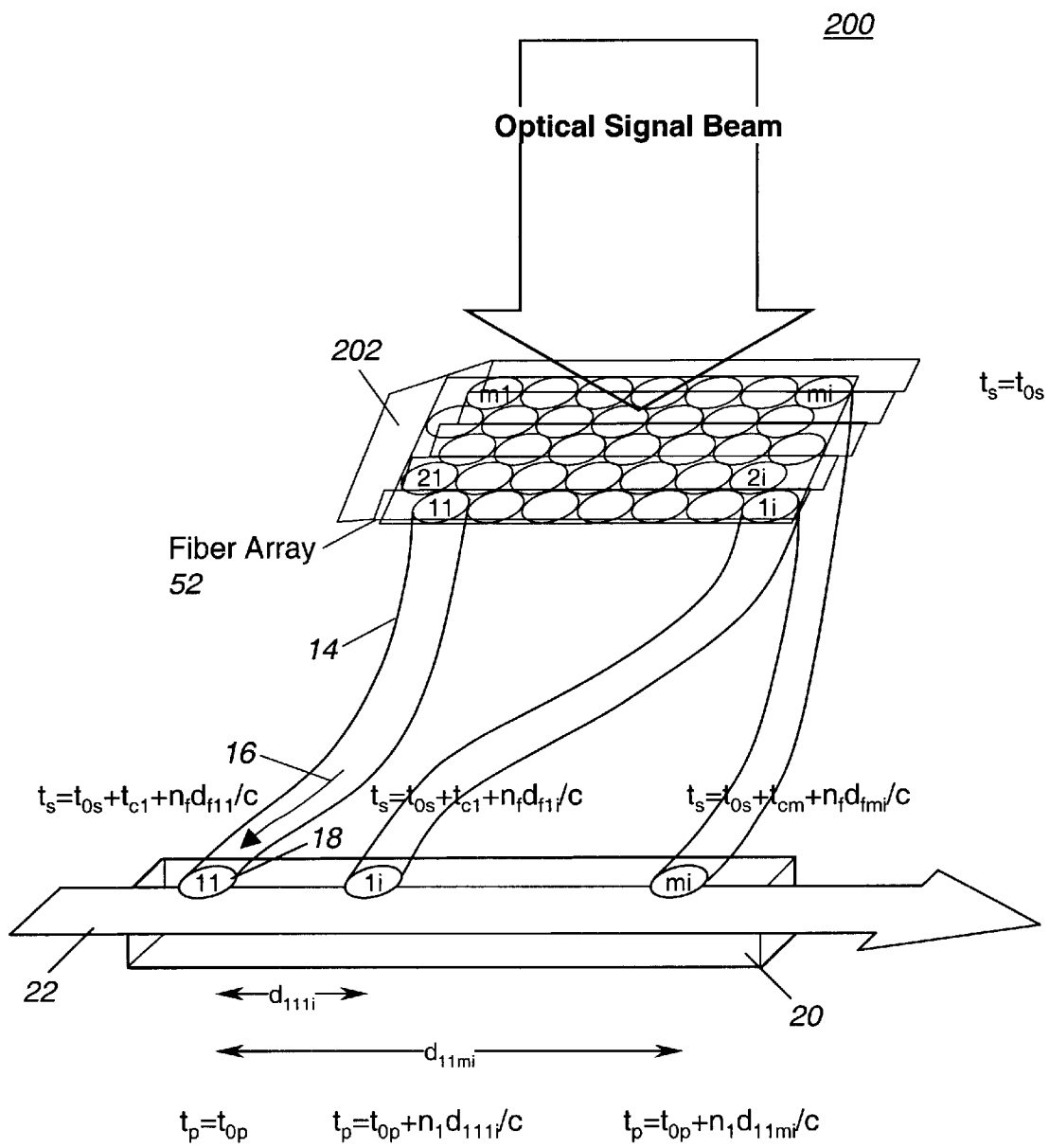
FIG. 5 is a diagram illustrating a configuration for providing time compensation for use with a serial reading technique in accordance with the present invention.
Figure 6:
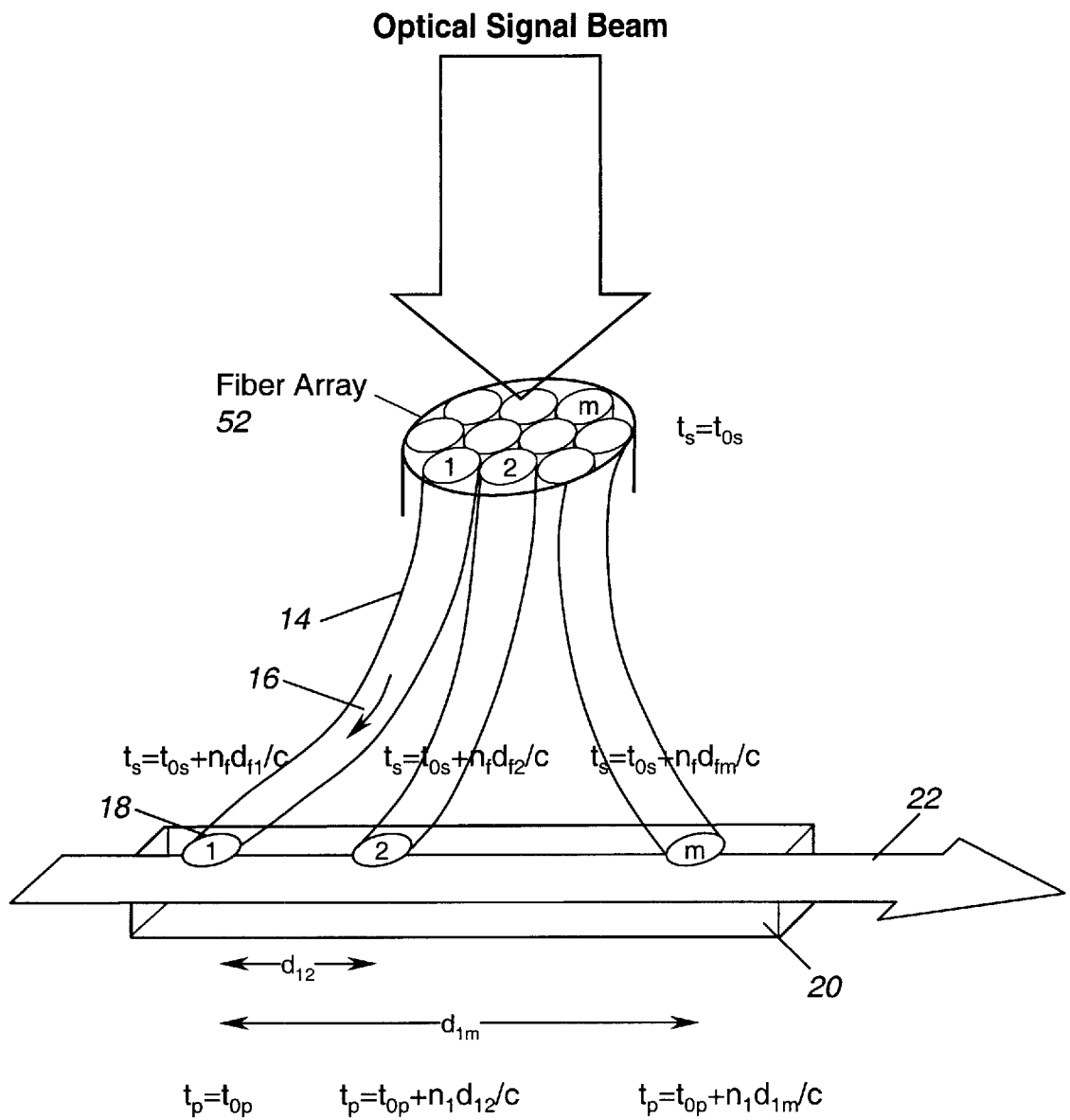
FIG. 6 is a diagram of another embodiment for providing two dimensional time compensation in accordance with the present invention.

Two time compensation architectures are illustrated in FIGS. 5 and 6 and will be subsequently described. The time compensated methodology provides a means for correcting optical delays which occur in a serial reading beam geometry due to the time required for the reading optical beam to propagate.

This propagation time t=nd/c, where n is the material index of refraction, d is the distance, and c is the speed of light. For a large array this propagation delay can seriously degrade the receiver temporal response. For example, a thousand element array of 15 $\mu$m diameter detectors would take 90 ps to read. This is twenty times slower than a typical photodetector temporal response. With a time compensated architecture the arrival of the signal beam at the photodetectors is made to be synchronous (either on a row by row as shown in FIG. 5, or element by element basis as shown in FIG. 6) with the arrival of the reading (probe) beam so that propagation delays do not accumulate. This avoids degrading the bandwidth. This is accomplished by inserting equivalent (compensating) optical delays in a prescribed manner into the signal beams.

FIG. 5 shows a one dimensional time compensation system for a serial optoelectronic reading device, generally illustrated by the numeral 200. Many of the parts of the system 200 are identical in construction to like parts in the interconnect illustrated in FIG. 2 described above, and accordingly, there have been applied to each part of the system in FIG. 5 a like reference numeral. The optical signal arrives at a time compensation element (TCE) 202. The TCE 202 comprises an optical wedge of the kind that is commercially available from several optical device manufacturers. The optical wedge is configured as an m×i matrix. As the TCE 202 lies in front of the optical fiber array 52. The optical signal at time $t_s=t_{os}$, transmits through the TCE 202 and propagates to the optoelectronic detector (not shown) at the end of the fiber at time $$t_s = t_{os} + t_{cm} + n_f d_{fmi}/c$$

where $t_{cm}$ is the time delay in row m of the TCE 202, $n_f$ is the index of refraction of the optical fiber 14, $d_{fmi}$ is the length of the optical fiber in row m and column i, and c is the speed of light.

If the fibers 14 are the same length and no time compensation element is included, then the probe beam 22 and the signal beam 16 accumulate a temporal error equal to $n_1 d_{11mi}/c$ which degrades the array's temporal resolution. The time compensation optical element 202 with $t_{cm} = n_1 d_{m1mi}$ serves to synchronize the probe beam 22 and the optical signal beam 16 at a point in each row of the array so that the temporal degradation is reduced.

Thus, each row is compensated. More particularly, the center element in each row is synchronized with the probe beam 22. Note the other elements in each row are not synchronized. Thus, this technique has some temporal resolution error associated with it, which would be analogous to time jitter. For a square fiber bundle 52, the one dimensional time compensation scheme allows the number of fibers to be squared (i.e., 10 fibers becomes 100 fibers) with the same temporal resolution (frequency bandwidth).

FIG. 6 shows an element by element time compensation architecture. The optical signal beam arrives at the fiber array 52 at time $t_s=t_{os}$ and propagates to the end of the fiber at time $$t_s = t_{os} + n_f d_{fm}/c$$

where $n_f$ is the index of refraction of the fiber 14, $d_{fm}$ is the length of fiber m, and c is the speed of light.

If the fibers 14 are the same length and no time compensation element is included, then the probe beam 22 and signal beam 16 accumulate a temporal error equal to $n_1 d_{1m}/c$ which degrades the array's temporal resolution. As, however, in accordance with this invention the fiber lengths are tailored such that $n_f(d_{fm}-d_{f1})=n_1 d_{1m}$ the probe and signal beam are synchronized at each point in the array. Thus, this embodiment does not degrade the optical reading of the probe beam.

Figure 7:
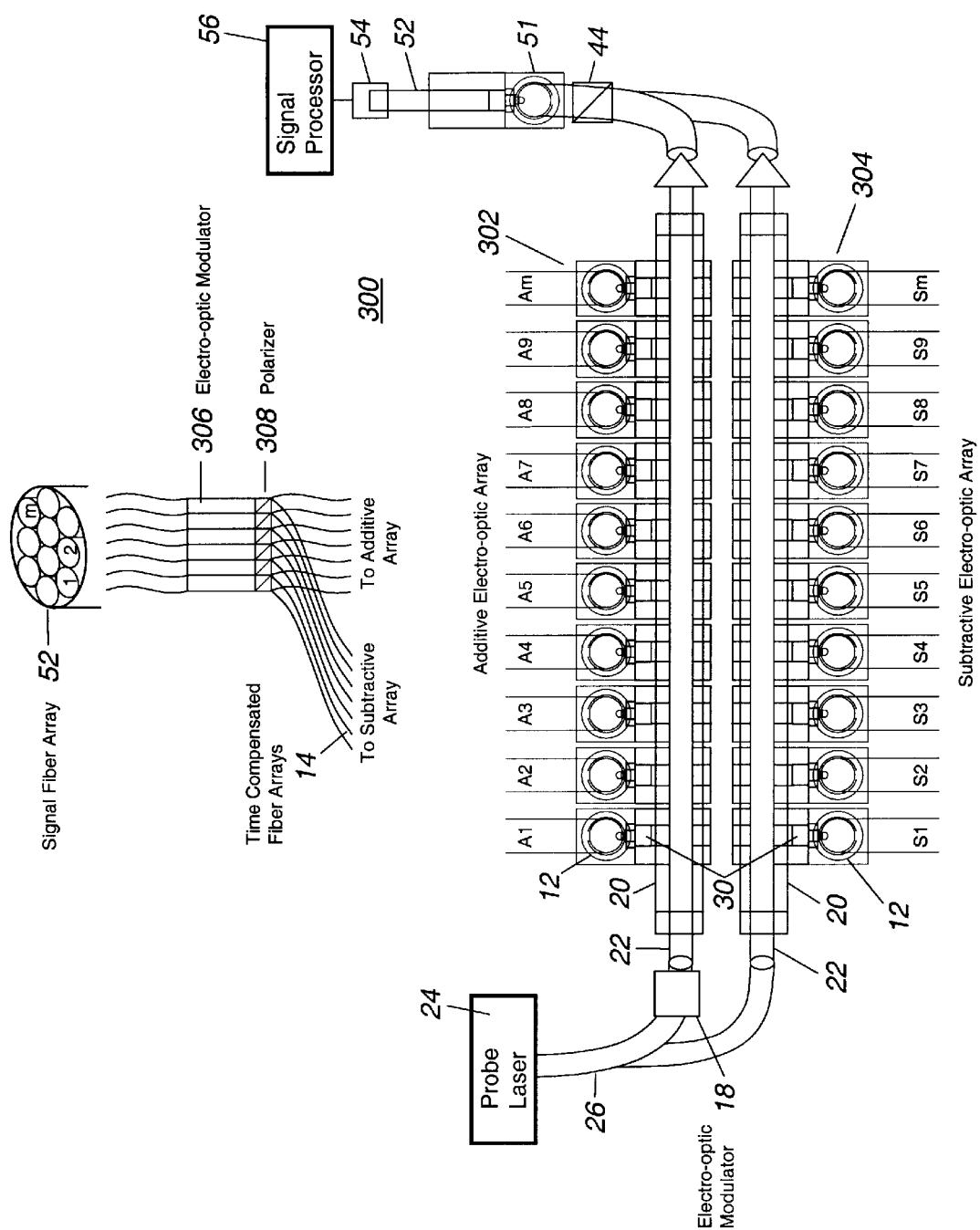
FIG. 7 is a diagram of an electro-optic interconnect arranged for adding and subtracting signal beams in accordance with the present invention.

With reference to FIG. 7, an optoelectronic interconnect 300 is illustrated. As shown, there are separate optoelectronic arrays, one for addition 302 and one for subtraction 304.

A modulator 18 is included in one arm and provides phase or polarization to the optical signal. Accordingly, the modulation can be adjusted to make the signals in-phase or out-of-phase by 180°. In-phase signals are additive and out-of-phase signals are subtractive.

The difference in the function of the arrays 302 and 304 results either from a change in the electro-optic orientation of the crystal 20 relative to the photodetector propagating electric field 38, a change in the semiconductor structure of the photodetector 12 to allow for an inversion of the bias voltage (from positive voltage to negative voltage), or the insertion of an electro-optic modulator 18 (phase or polarization) before and/or after one of the photodetector arrays 302. The signal on each individual fiber 14 in the array 52 is either routed to the positive or negative photodetector array with an electro-optic modulator 306 and polarizer 308. Passive time compensation architectures need to be incorporated into the signal fiber array in order to synchronize the probe 22 and photodetector electric field 38 at each point in the interconnect 300. Active time or non-synchronous passive compensation architectures can be implemented to provide additional functional capability (for example, dynamically controlled probe sequences) or environmental corrections. The interconnect may be operable with amplitude or phase/polarization rotation embodiments.

Figure 8:
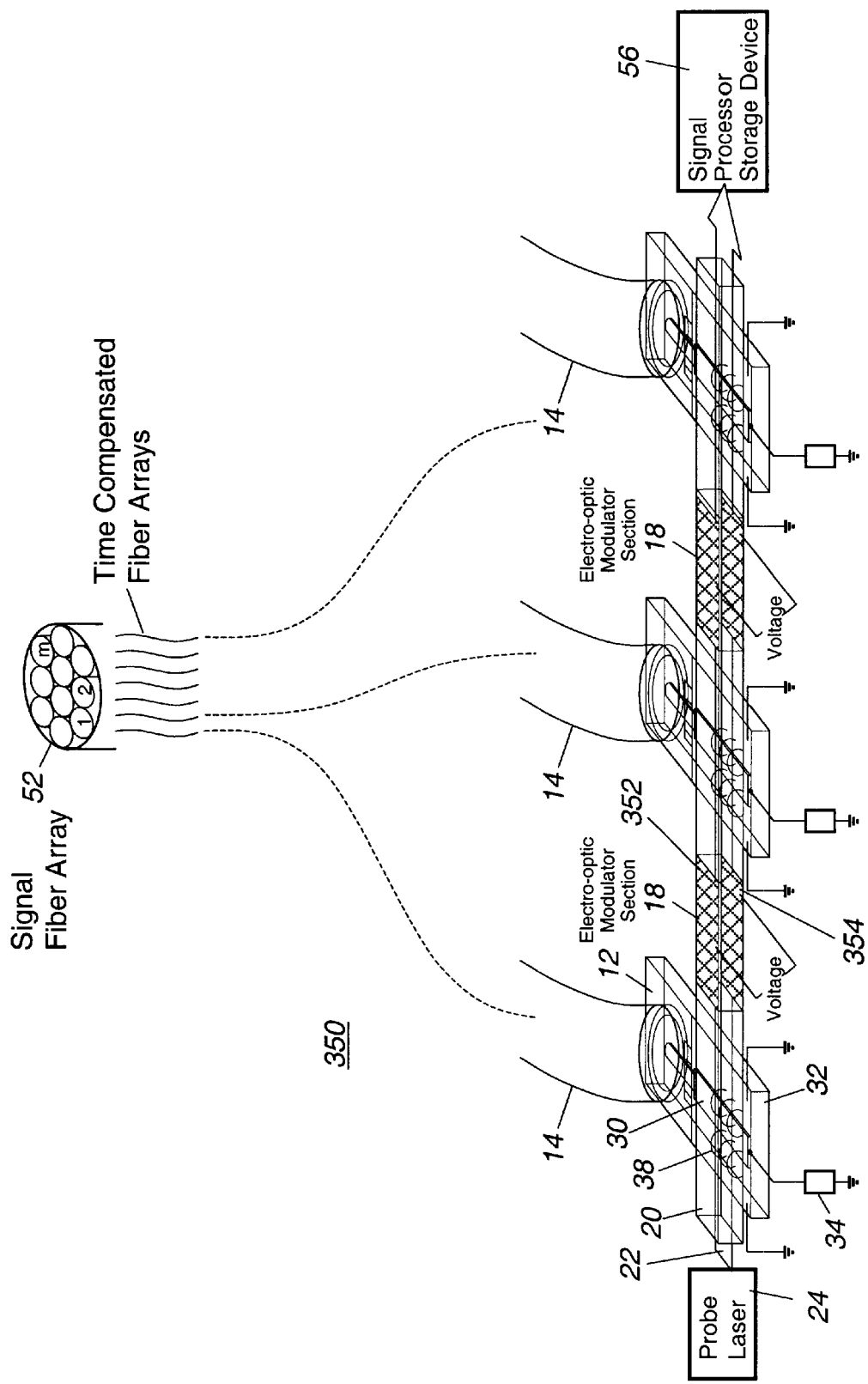
FIG. 8 is a diagram of an electro-optic interconnect arranged in an alternative embodiment for adding and subtracting signal beams in accordance with the present invention.

FIG. 8 shows an electro-optic arithmetic interconnect 350. In this embodiment an electro-optic modulator 18 (phase or polarization) is inserted in between each individual photodetector element. These additional modulators can electrodes 352 and 354 along the appropriate crystal axis and applying a voltage across the crystal 20. These additional modulators 18 can either be resonant or traveling wave devices. The application of voltage across these electrodes 352 and 354 will in effect alter the polarization (phase) of the probe beam 22 so that addition or subtraction can occur at each separate photodetector 12. Passive time compensation architectures as shown in FIGS. 5 and 6 need to be incorporated into the signal fiber array in order to synchronize the probe and photodetector electric field at each point in the interconnect. Active or nonsynchronous passive time compensation architectures can be implemented to provide additional functional capability (for example, dynamically controlled probe sequences) or environmental corrections. The interconnect may be operable amplitude or phase/polarization rotation embodiments.

Accordingly, an electro-optic interconnect that can be configured for adding and subtracting optical signals is provided.

Obviously, many modification and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An electro-optic interconnect for receiving optical signals containing information and a probe beam comprising:
    a plurality of first optoelectronic detector means, each being responsive to an optical signal and operative to develop a plurality of electrical signals, each representing a portion of the information;
    means for generating an optical probe beam;
    means responsive to said plurality of electrical signals and operative to change a characteristic of said optical probe beam corresponding to the information, wherein the portions of information represented by said plurality of electrical signals have a combined effect on the characteristic of said optical probe beam, and wherein said means responsive to said plurality of electrical signals comprises means for propagating said optical probe beam; and
    means for coupling said optical probe beam out of the electro-optic interconnect.

2. The electro-optic interconnect as recited in claim 1 and further comprising:
    a second optoelectronic detector responsive to the changed characteristic and operative to develop an output electrical signal representative of the information contained in said optical signals; and
    processing means for processing said output electrical signal.

3. The electro-optic interconnect as recited in claim 1 wherein the information is amplitude modulated.

4. The electro-optic interconnect as recited in claim 1 wherein the information is modulated.

5. The electro-optic interconnect as recited in claim 1 and further comprising a plurality of optical fibers configured in a matrix.

6. The electro-optic interconnect as recited in claim 5 and further comprising time compensation means for synchronizing said plurality of electrical signals.

7. The electro-optic interconnect as recited in claim 6 wherein said matrix comprises m columns and i rows, and wherein the central optical fiber in each column is synchronized.

8. The electro-optic interconnect as recited in claim 7 wherein each optical fiber comprises a length having a dimension for synchronizing said plurality of electrical signals.

9. The electro-optic interconnect as recited in claim 1 wherein said means for propagating comprises an electro-optic crystal.

10. An electro-optic interconnect for receiving optical signals containing information and a probe beam comprising:
    a plurality of first optoelectronic detector means configured in a matrix, each being responsive to an optical signal and operative to develop a plurality of electrical signals, each representing a portion of the information;
    means for generating an optical probe beam;
    means responsive to said plurality of electrical signals and operative to change a characteristic of said optical probe beam corresponding to the information, wherein the portions of information represented by said plurality of electrical signals have a combined effect on the characteristic of said optical probe beam, and wherein said means responsive to said plurality of electrical signals comprises means for propagating said optical probe beam; and
    a second optoelectronic detector responsive to the changed characteristic and operative to develop an output electrical signal representative of the information contained in said optical signals.

11. The electro-optic interconnect as recited in claim 10 wherein said matrix is linear.

12. The electro-optic interconnect as recited in claim 11 wherein said plurality of first optoelectronic detectors in said linear matrix is configured in a velocity matched arrangement.

13. An electro-optic interconnect for receiving optical signals containing information and a probe beam comprising:
    a plurality of first optoelectronic detector means each of which comprises an optoelectronic detector and a stripline, each being responsive to an optical signal and operative to develop a plurality of electrical signals, each representing a portion of the information;
    means for generating an optical probe beam;
    means responsive to said plurality of electrical signals and operative to change a characteristic of said optical probe beam corresponding to the information, wherein the portions of information represented by said plurality of electrical signals have a combined effect on the characteristic of said optical probe beam, and wherein said means responsive to said plurality of electrical signals comprises means for propagating said optical probe beam; and a second optoelectronic detector responsive to the changed characteristic and operative to develop an output electrical signal representative of the information contained in said optical signals.

14. An electro-optic interconnect for receiving optical signals containing information and a probe beam comprising:

a plurality of first optoelectronic detector means, each being responsive to an optical signal and operative to develop a plurality of electrical signals, each representing a portion of the information;

means for generating an optical probe beam;

means responsive to said plurality of electrical signals and operative to change a characteristic of said optical probe beam corresponding to the information;

a second optoelectronic detector responsive to the changed characteristic and operative to develop an output electrical signal representative of the information contained in said optical signals; and an interferometer having an adjustable leg and a reference leg, each receiving said optical probe beam, said adjustable leg responds to said plurality of electrical signals to change the phase of said optical probe beam relative to the phase of said optical probe beam propagating through said reference leg.

15. An electro-optic interconnect for receiving optical signals containing information and a probe beam comprising:

a plurality of first optoelectronic detector means, each being responsive to an optical signal and operative to develop a plurality of electrical signals, each representing a portion of the information, said plurality of first optoelectronic detector means adding the optical signals;

means for generating an optical probe beam;

means responsive to said plurality of electrical signals and operative to change a characteristic of said optical probe beam corresponding to the information;

a second optoelectronic detector responsive to the changed characteristic and operative to develop an output electrical signal representative of the information contained in said optical signals; and a plurality of third optoelectronic detector means configured to subtract the optical signals propagated thereto.

16. An electro-optic interconnect for receiving optical signals containing information and a probe beam comprising:

a plurality of first optoelectronic detector means, each being responsive to an optical signal and operative to develop a plurality of electrical signals, each representing a portion of the information;

means for generating an optical probe beam;

means for modulating the probe beam;

means responsive to said plurality of electrical signals and operative to change a characteristic of said optical probe beam corresponding to the information, wherein the portions of information represented by said plurality of electrical signals have a combined effect on the characteristic of said optical probe beam, and wherein said means responsive to said plurality of electrical signals comprises means for propagating said optical probe beam; and a second optoelectronic detector responsive to the changed characteristic and operative to develop an output electrical signal representative of the information contained in said optical signals.

17. The electro-optic interconnect as recited in claim 16 wherein said means for modulating comprises a plurality of modulators, one of said modulators being disposed adjacent one of said first optoelectronic detector means.

* * * * *